March 26, 1929. L. W. LESSLER ET AL 1,707,022
CAMERA FRONT
Filed April 23, 1926
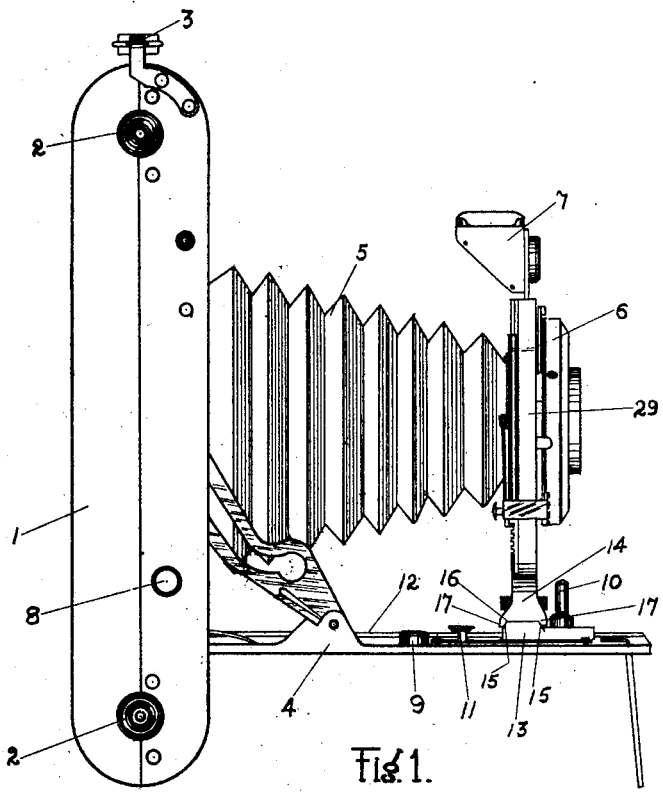
Fig. 1.
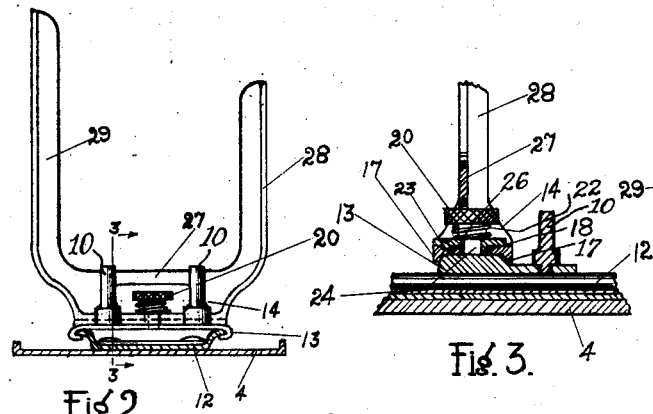
Fig. 2. Fig. 3. Fig. 4.
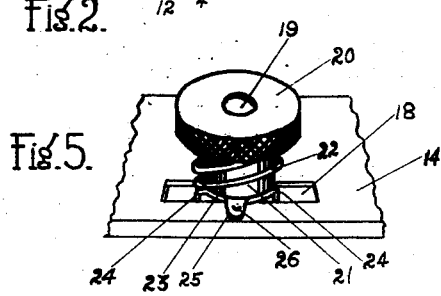
Fig. 5.
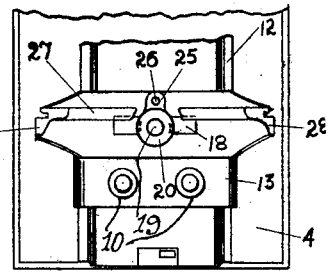
INVENTOR
LEW W. LESSLER.
CARL A. BORNMANN.
BY
ATTORNEY Patented Mar. 26, 1929.

1,707,022

UNITED STATES PATENT OFFICE.

LEW W. LESSLER, OF JOHNSON CITY, AND CARL A. BORNMANN, OF BINGHAMTON, NEW YORK, ASSIGNORS, BY MESNE ASSIGNMENTS, TO AGFA ANSCO CORPORATION, OF BINGHAMTON, NEW YORK, A CORPORATION OF NEW YORK.

CAMERA FRONT.

Application filed April 23, 1926. Serial No. 104,117.

Our invention pertains to photographic cameras and has particular reference to a new front and shutter support therefor.

As is well known, it is often desirable to slide from one side to the other the shutter and lens support of a camera in order to more accurately record photographically elongated objects of which an image is being made.

The primary object of my invention is to provide a camera front which has novel means for accomplishing this sidewise movement.

Another object is to provide a means for retaining the front substantially rigid while the adjusting operation is being performed.

Another object is to provide means whereby the correct centering of the front after adjustments have been made may be accomplished with a minimum of effort and with positive accuracy.

Other objects in details of construction and operation will be apparent as the description proceeds, reference being had to the accompanying drawing wherein like reference numerals indicate like parts.

In the drawing:—

Figure 1 is a side view of a photographic camera equipped with my improved front.

Figure 2 is a detail elevation of the front, the platform support therefor being shown in section.

Figure 3 is a detail sectional view taken on the line 3—3 of Figure 2 and looking in the direction of the arrows.

Figure 4 is a detail plan view of my improved front certain parts having been omitted for clearness.

Figure 5 is a detail perspective of the locking and centering device.

Reference numeral 1 indicates generally the body of a photographic camera of the folding type provided with the usual spool pins 2, handle 3, platform 4, bellows 5, shutter 6, and view finder 7. These parts are of the conventional type and need not be described in detail. The usual tripod sockets 8 and 9, finger pieces 10 and focusing device 11 are also illustrated diagrammatically.

Secured to the platform 4 is the usual rail member 12 upon which is adapted to slide a box member 13 which supports the camera front 14 upon which the shutter 6 is mounted.

The box member 13 is slightly enlarged at its rear end, such enlargement having its upper edges bevelled as at 15 lengthwise of the box 13 and laterally of the platform 4.

The camera front 14 is prefarbly a one piece casting, although it may be otherwise formed, and has its lower end dove-tailed on its under surface as at 16 with the overhanging edges 17 embracing the bevelled edges 15 of the box 13 whereby the front 14 may slide longitudinally on the box 13 laterally of the camera.

This dove-tailed portion of the lower end of the front 14 is recessed as at 18 and upwardly through this recess extends a pin 19 provided at its upper end with threads (not shown) upon which is threaded the knurled adjusting screw 20. This adjusting screw 20 carries a sleeve 21 surrounding the pin 19 above the recessed portion of the front 4. This is illustrated clearly in Figure 5. A coil spring 22 encircles the sleeve 21 between the knurled head 20 and the recessed portion of the front and exerts sufficient tension between these parts when the finger piece 20 is loosened or unscrewed on the pin 19, to hold the front substantially rigid with relation to the sliding box 13. It will be noted that the pin 19 extending through the slot 18 forms a guide for the lateral sliding movement of the front 14 upon the box 13. It will also be understood that when the set screw or finger piece 20 is tightened on the pin 19, against the tension of the spring 22, the front will be held absolutely rigid and immovable with relation to such sliding box.

In order that the center point between the box 13 and the sliding front 14 may be easily found and the front adjusted to such point with a minimum of difficulty, a washer 23 has been provided between the lower end of the sleeve 21 and the recessed portion of the front 14. This washer is provided with downwardly turned ears 24 extending into the recesses 18 thus preventing rotation and consequent accidental displacement of the washer. The washer 23 is provided with a laterally extending finger 25 provided with a downwardly punched indentation 26 adapted to fit into a similar indentation (not shown) formed on the recessed portion of the front 14 to the exact central point thereof and in the path of the finger 25 of the washer.

A cross piece 27 extends between the lower ends of the legs 28 and 29 of the front and directly over the knurled finger piece 20 thus providing both a reinforcement for the front and also means for preventing the finger piece 20 from being completely unscrewed from the pin 19.

The operation of the parts so far described is as follows:—Ordinarily the front 14 will be set centrally of the sliding box 13 with the indented finger 25 engaging within the corresponding indentation on the recessed portion of the front 14, and locked in such position by tightening the finger piece 20 downwardly upon the pin 19 against the tension of the spring 22. If it is now desired to move the front 14 to one side or the other, the finger piece 20 is loosened whereupon the front 14 may be slid sidewise upon the box 13, guided by the pin 19 and the downwardly turned ear of the washer 23 to the desired point. During such operation, it will be understood that with the tension relieved from the washer 23, the indented finger 25 will ride up out of its centrally located seat and slide along on the surface of the recessed portion of the front 14. It will also be understood that while this operation is taking place, that is when the finger piece 20 is loosened, the spring 22 will still exert a sufficient tension to maintain the front 14 substantially rigid and prevent its tipping over or becoming otherwise displaced. When the desired adjustment has been made, the finger piece 20 is again tightened thus rigidly securing the front in its adjusted position. After the exposure has been made in such adjusted position, the finger piece 20 is again loosened and the front 14 slid back until the indented finger 25 on the washer 23 snaps into its seat, in which position the operator knows that the front is again centrally positioned and may again be tightened.

From the foregoing, it will be understood that we have provided a novel form of camera front particularly adaptable for adjustments laterally on the sliding box carried by the camera platform. This adjusting means being particularly adaptable to the U type of camera front now commonly used.

Of course many changes in details of construction and arrangement of parts may be made without departing from the scope of our invention and we do not limit ourselves therefore to the exact forms shown other than by the appended claims.

We claim:—

1. A camera front comprising a frame, a support therefor provided with a lateral slideway, said frame being slidable thereon, and provided with a slot, and means for securing said frame in position on said track comprising a headed set screw passing through said slot and threaded in said support.

2. A camera front comprising a frame, a support therefor provided with a lateral slideway, said frame being slidable thereon, and provided with a slot, and means for securing said frame in position on said track comprising a headed set screw passing through said slot and threaded in said support, and a coiled spring encircling said screw between the head thereof and said support.

3. A camera front comprising a frame, a support therefor provided with a lateral slideway, said frame being slidable thereon, and provided with a slot in the base thereof, a headed set screw passing through said slot and threaded in said support, a washer encircling said screw and provided with an indented tongue, said support having an indentation centrally thereof to receive the indented portion of said tongue, and a coiled spring encircling said screw between the head thereof and said washer.

4. A camera front comprising a frame, a support therefor provided with a lateral slideway, said frame being slidable thereon, and provided with a slot in the base thereof, a headed set screw passing through said slot and threaded in said support, a washer encircling said screw and provided with an indented tongue, said support having an indentation centrally thereof to receive the indented portion of said tongue, and a coiled spring encircling said screw between the head thereof and said washer, and ears on said washer engaging in said slot.

LEW W. LESSLER.
CARL A. BORNMANN.